Nov. 20, 1945.   O. WIRTH   2,389,336
MACHINE FOR WINDING THE STATORS OF ELECTRIC MOTORS
Filed Aug. 28, 1942   5 Sheets-Sheet 1
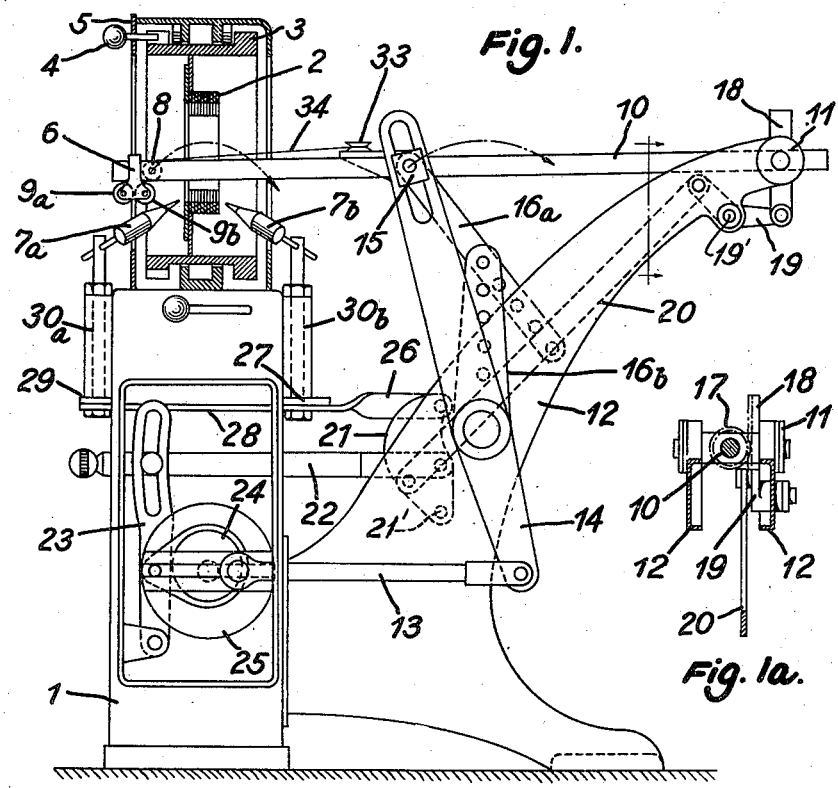
Fig. 1.
Fig. 1a.
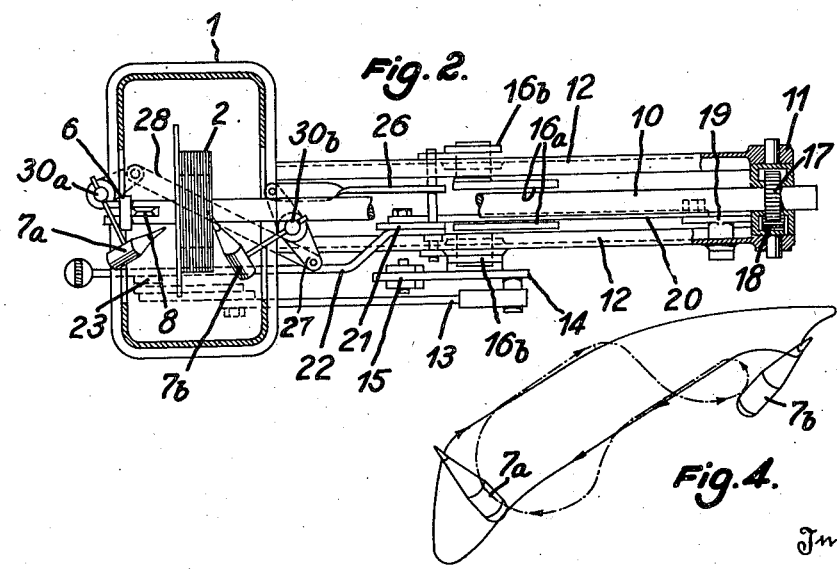
Fig. 2.
Fig. 4.
Inventor:
Otto Wirth,
by Pierce & Scheffler,
Attorneys.

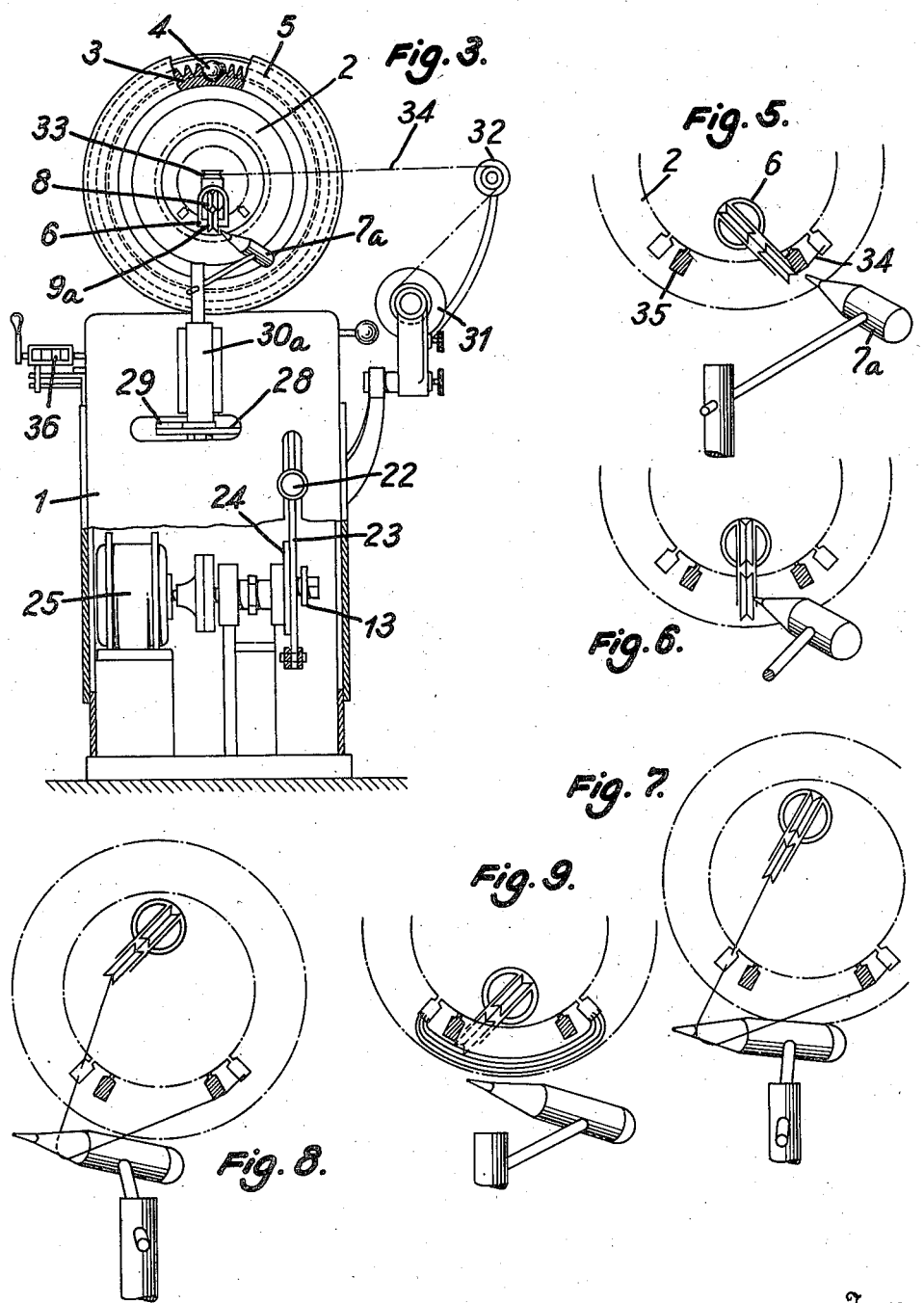

Nov. 20, 1945.   O. WIRTH   2,389,336
MACHINE FOR WINDING THE STATORS OF ELECTRIC MOTORS
Filed Aug. 28, 1942   5 Sheets-Sheet 3

Inventor:
Otto Wirth,
by Pierce & Scheffler,
Attorneys

Nov. 20, 1945.  O. WIRTH  2,389,336

MACHINE FOR WINDING THE STATORS OF ELECTRIC MOTORS

Filed Aug. 28, 1942  5 Sheets-Sheet 4

Inventor:
Otto Wirth,
by Pierce & Scheffler
Attorneys.

Nov. 20, 1945.　　　O. WIRTH　　　2,389,336
MACHINE FOR WINDING THE STATORS OF ELECTRIC MOTORS
Filed Aug. 28, 1942　　　5 Sheets-Sheet 5

Inventor:
Otto Wirth,
by Pierce & Scheffler
Attorneys.

Patented Nov. 20, 1945

2,389,336

UNITED STATES PATENT OFFICE 2,389,336

MACHINE FOR WINDING THE STATORS OF ELECTRIC MOTORS

Otto Wirth, Zurich, Switzerland, assignor to Micafil Ltd. Works for Electrical Insulation and Winding Machines, Zurich, Switzerland Application August 28, 1942, Serial No. 456,565
In Germany August 5, 1941

33 Claims. (Cl. 242—1)

The stator and field windings of electric motors can be wound according to different diagrams but the manner in which they are inserted into the slots is always the same. Each coil is wound on a winding former and each limb, wire by wire, is laid separately into the slot whereupon the projecting coil ends are adapted to the circular form of the stator. The winding process thus consists of three operations which are partly performed on the machine and partly by hand.

The present invention concerns a machine for winding the stators of electric motors by means of which the wire, without the use of winding formers, is given the shape which it must have when the winding is in the finished state. For guiding and locating the wire into the stator slots a winding head is used, which on the one hand is moved in an axial direction backwards and forwards over the slot pair which is to be wound, and on the other hand is swung backwards and forwards in a circumferential direction on both end surfaces of the stator and furthermore also upwards and downwards in a radial direction along a diameter of the stator bore. According to the invention, during the axial movement of the winding head the wire which is passed over the winding head is laid through the slit into the stator slot, but during the swinging movement for the formation of the coil heads the movement of the winding head differs completely from the coil form, a much longer distance being traversed by the winding head, this distance being composed of said swinging movement and an additional axial movement, whereby the sliding off of the wire on the end surfaces of stator in the form of the coil head is assisted by a finger located at each end surface, said fingers being given a reciprocating angular rotation about an axis which has an angular displacement relative to the stator axis. By reducing the three operations to a single one, about 60–70% of the former winding time can be saved. The machine can be attended by unskilled workers.

A constructional example of the invention is illustrated diagrammatically in Fig. 1 of the accompanying drawings where a side elevation partly in section is shown. Fig. 2 shows a plan view of the machine and Fig. 3 a front view of same. Fig. 4 shows a diagram of the path traversed by the winding wire and Figs. 5–9 show various phases of the position of the winding head and fingers, whilst Fig. 1a illustrates a detail of the drive.

Figs. 15 to 18 inclusive are fragmentary schematic views showing different phase relations of a guide finger to the stator.

Figure 19:
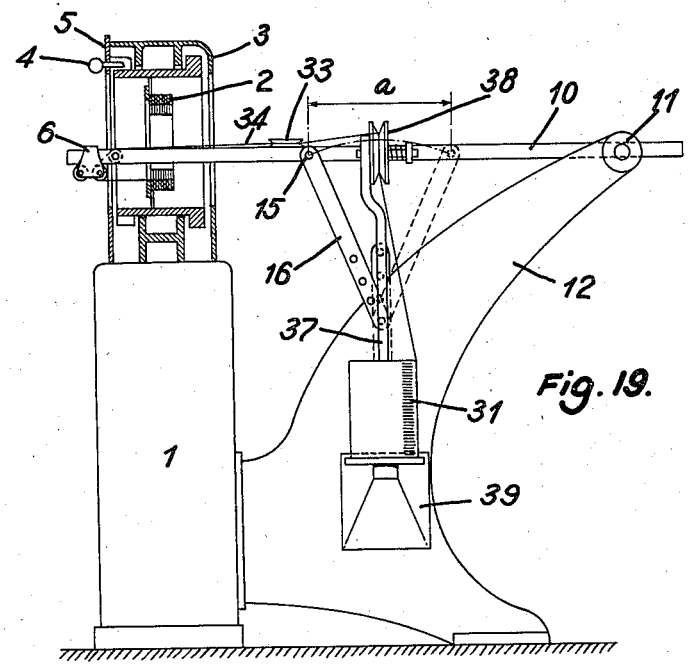
Figure 20:
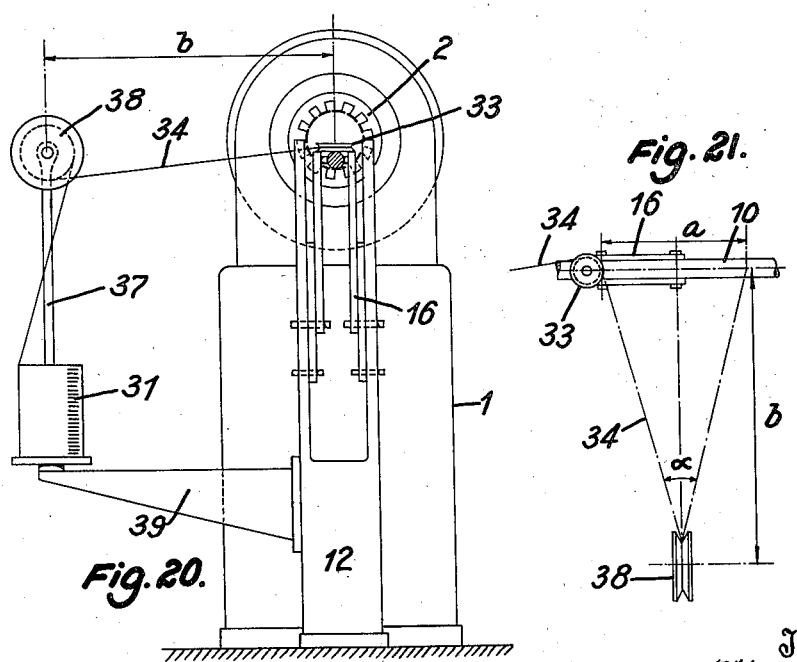
Figure 21:
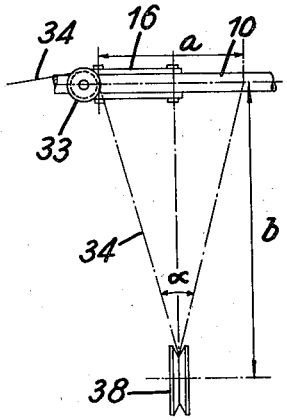

Figs. 19 and 20 are schematic and fragmentary elevation and plan views, respectively, of another embodiment in which the wire is drawn from a spool that is spaced laterally from and with its axis normal to the axis of the stator; and Fig. 21 is a schematic view showing the limits of the angular displacement of the wire path that arise from longitudinal displacement of the rod that carries the winding head.

The winding machine consists of a stationary stand 1 for the stator 2 which is to be wound and which is centered in a ring 3 which can rotate freely, the driving mechanism for the winding device itself and also the driving motor 25.

Ring 3 for the stator 2 which is to be wound can be fixed in any position on the stand by means of a pawl 4 and an annular ratchet disc 5. Ring 3 can if necessary be moved backwards and forwards mechanically when the winding pitch of the coils exceeds an angle of about 100°.

The movable winding part of the winding machine consists of the winding head 6 and both fingers 7a, 7b. In addition to the catch roller 8 for the wire the winding head 6 is also provided with two toothed guide rollers 9a, 9b which mesh with each other. By means of these rollers the wire is not twisted but only bent; the teeth prevent the wire from leaving the rollers. Winding head 6 is located at the free end of rod 10 which can slide in a longitudinal direction in bearing 11 and is rotatable about its axis. Bearing 11 is fixed to an arm 12 of stand 1. Winding head 6 must in addition to its forward and backward movement through the stator 2 which is to be wound, also perform an upward and downward movement and also between each forward and backward movement a reciprocating angular movement in a plane perpendicular to the first mentioned plane of motion. The forward and backward motion of rod 10 with winding head 6 is produced by means of crank rod 13 and the double-armed lever 14 mounted on arm 12. One arm of lever 14 has a slot in which the link block 15 slides. Rod 10 can rotate in the link block 15, This link guide causes the end of rod 10 carrying the winding head 6 to move along the path of an arc, the highest point of which lies in the central plane of stator 2. In both end positions winding head 6 lies at least a single slot length beyond the end surfaces of stator 2 and in the radial direction lower than the bottom of the slot. Link block 15 describes a circular path about the point of intersection of both levers 16a and 16b. By altering this point of intersection or varying the length of rotatable lever 16a and fixed lever 16b the motion of winding head 6 can be adjusted to suit the different diameters and widths of iron of the stator which is to be wound.

In addition to the reciprocating movement in the path of an arc a swinging motion about the rod axis is imparted to the winding head 6 by a pinion 17 at the bearing end of the rod which engages with a rack 18. The rod 10 and pinion 17 are connected by a spline, not shown, and the rod is axially slidable in the pinion. Rack 18 is moved up and down by means of angle lever 19, rod 20, lever 21, linkage 22, 23 and cam 24. With the aid of pinion 17 rod 10 is rotated about its axis so that winding head 6 executes an angular movement which is preferably greater than the width of the coil to be wound. Angle lever 19 and guide lever 21 are journalled on arm 12 by pivot pins 19', 21', respectively, and rod 23 is pivoted in stand 1. Rod 23 executes an oscillating movement caused by cam 24, and this motion is transmitted to guide lever 21 by means of rod 22. By altering the connecting point of the rods 22, 23 the deflection of the pendulum movement can be varied. For this purpose rod 23 is provided with a curved slot at its free end in which the free end of rod 22 can be shifted. Coupled to lever 21 by means of rod 26, double-armed lever 27, connecting rods 28 and lever 29, are the rotatable supports 30a, 30b for fingers 7a, 7b which work together with the winding head 6. These fingers project into the rotatable ring 3 for the stator 2 which is to be wound and their position can be adjusted. When the connecting point of rods 22, 23 is altered the angle of deflection for the swinging motion of fingers 7a, 7b is also altered.

Wire 34 is fed to winding head 6 from the supply spool 31 over guide rollers 32, 33. Roller 32 is mounted on a spring rocker arm.

The winding machine operates as follows: At the commencement of the winding process the winding head 6 lies in front of the stator 2 to be wound, outside of ring 3, as shown in Fig. 1, and is in the lowest position turned towards the right, corresponding to Fig. 5. As soon as driving motor 25 starts to run, crank rod 13 and cam 24 are set in motion by means of gearing. Finger 7a is swung about the axis of its support 30a to the left. Finger 7a thus comes to lie above wire 34. Winding head 6 and finger 7a reach the position shown in Fig. 6. The finger has caught the wire. Winding head 6 now describes an up and down movement on the path of the arc determined by lever 16a and is thus moved backwards, performing a turning movement at the same time and reaching the position shown in Fig. 7. The wire forms a loop around finger 7a. The direction of the wire is determined by the position of winding head 6 and the angle of deflection of finger 7a, so that the wire passes of its own accord and without any assistance into the stator slot. After this turning and reverse movement along the path of an arc is completed, winding head 6 and finger 7a reach the position shown in Fig. 8. Wire 34 has been placed in the slot on the extreme left. Finger 7a moves back to its initial position whereby due to its conical shape it can free itself from the wire without friction. During the angular movement of the finger at one end it only reverses its direction of motion when the winding head has passed through the stator to the other end. The winding process described repeats itself at the end of the stator and the wire 34 is located in the slot on the extreme right. During the winding operation winding head 6 follows the broken line path shown in the diagram of Fig. 4 which corresponds to the finished coil form but is larger than this. Fingers 7a, 7b serve to shape the corners of the coil form. In order to form the coil ends at one end of the stator, each finger 7a, 7b holds the wire tight as long as the winding head passes through the stator and releases it only when the wire is located in the slot and the winding head approaches its lowest position at the other end of the stator, the wire being pulled tight through the slot.

To facilitate the winding operation it is advisable to insert easily removable horns 35 in the empty slots next to those which are to be wound, these horns projecting beyond the end surfaces of the stator core. The shape of these horns influences the form of the coil ends. All the movements of the winding head and fingers required for the winding process can be adjusted by altering the connection of levers 16a, 16b and that of rods 22, 23, so that they can be adapted to suit various kinds of stators. The turning movement of winding head 6 can be timed differently relative to its backward and forward movement, whereby the fingers must also be moved at the same time as the winding head is turned.

The number of windings which are completed is shown on winding counter 36 (see Fig. 3) which is actuated when the winding head is in the rear position.

According to this constructional example of the invention described the fingers perform a combined movement. This arrangement can be simplified if it is designed as shown in Figs. 10–18, where Figs. 15–18 correspond to Figs. 5–9.

In this case both wire guiding fingers are fixed in a movable and adjustable manner to both ends of a common push rod which is arranged inclined to the axis of the stator, this rod being moved backwards and forwards in a longitudinal direction only in the same rhythm as the movable support of the winding head.

Figure 10:
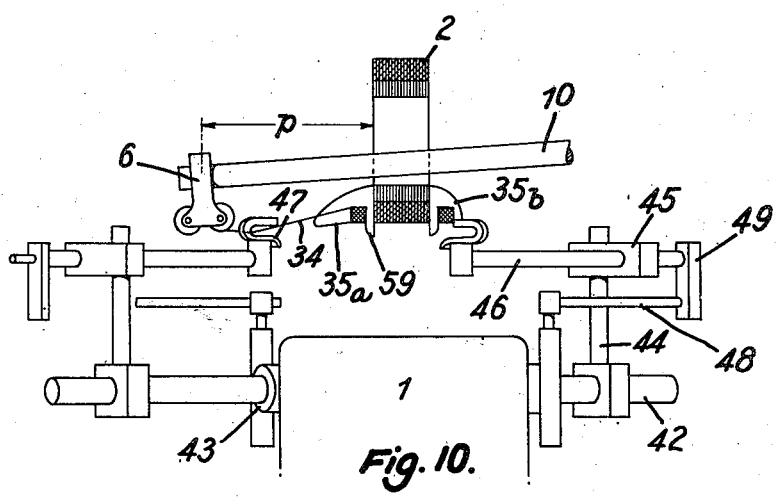
Figs. 10 and 11 are fragmentary elevation and plan views, respectively, and with the stator shown in section, of another embodiment of the invention.
Figure 11:
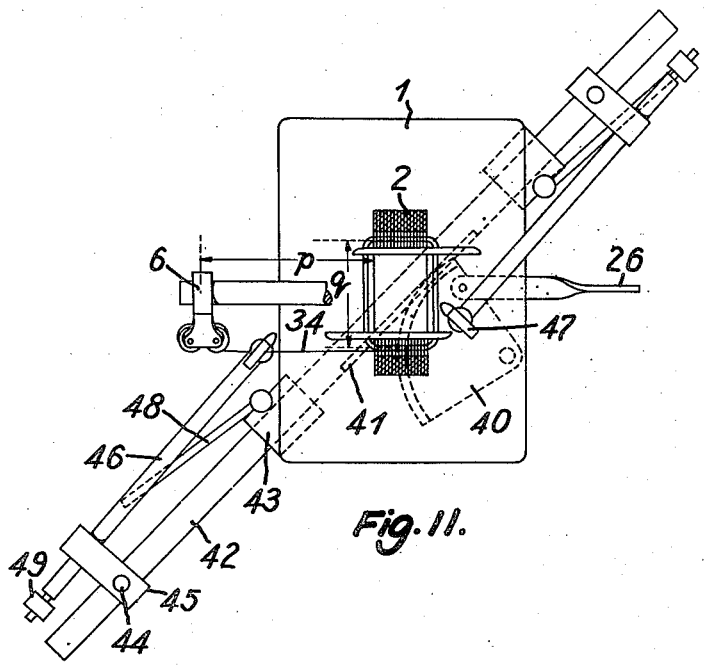
Figure 14:
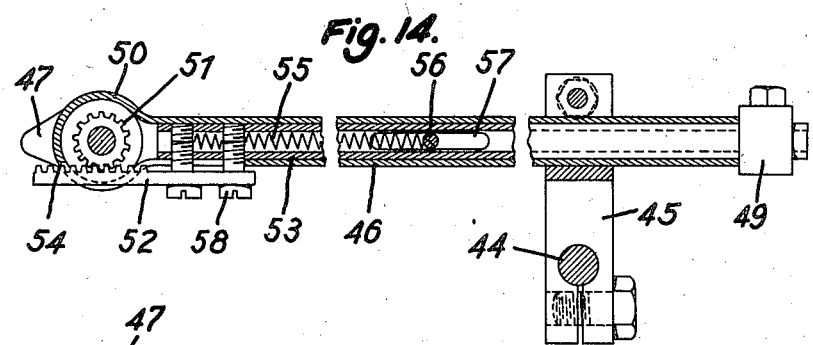
Figs. 13 and 14 are fragmentary elevation and plan views, respectively, and on a larger scale and with parts shown in central longitudinal section, of a guide finger and associated mechanism.
Figure 13:
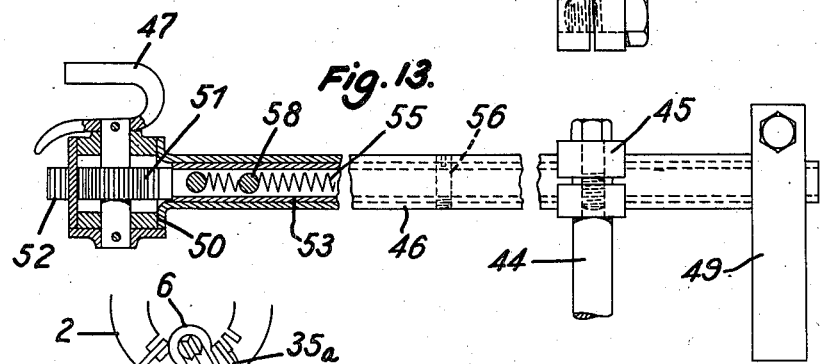
Figures 12, 15:
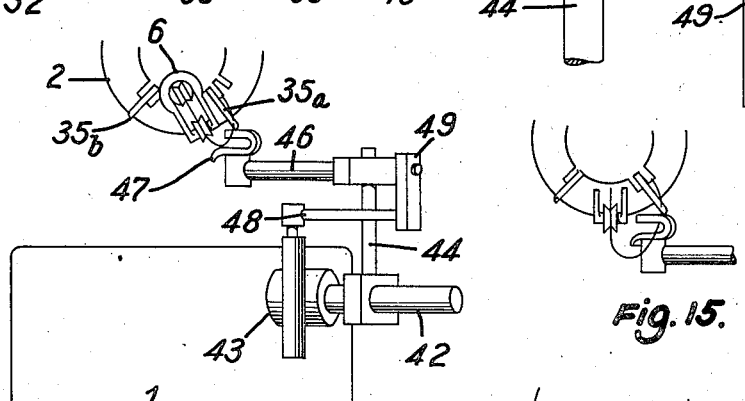
Fig. 12 is a fragmentary elevation of the same as viewed from the left side of Figs. 10 and 11.
Figure 16:
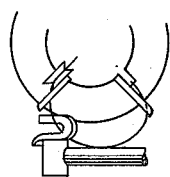

This embodiment of the invention is illustrated in Figs. 10–18 of the accompanying drawings where Fig. 10 shows a vertical section, Fig. 11 a horizontal section through a stator which is to be wound together with the push rod, the wire guiding fingers, etc. and Fig. 12 a side elevation. Figs. 13 and 14 show one of these fingers with its supporting rod separately to a larger scale, and Figs. 15–18 show similar to Figs. 5–9, the position of the fingers when the wire is being guided and the coil ends formed.

As a contrast to the constructional example already described the fingers are in this case bent like a hook and directly mounted on movable axes which are located on their supporting arms. The turning movement of the fingers is caused by adjustable stops which are arranged on the stationary part of the machine.

In Figs. 10, 11 and 12 the reference numeral 1 indicates the machine housing and 2 the stator iron which is to be wound by the winding head 6 located at the end of rod 10. Lever 26 is actuated by the rhythmical movement of rod 10 in a manner which can be seen from Figs. 1, 1a and 2. The lever 26 operates in the same rhythm over toothed segment 40 the push rod 42 which is also provided with teeth and can be displaced backwards and forwards in a longitudinal direction in the guide collars 43 fixed to housing 1. This rod is moved in a straight line, which in the horizontal plane, that is to say in the plan view (Fig. 11), is inclined at 40-50° to the stator axis, and at its end it is fitted with supporting pins 44 for the clips 45 by which the arms 46 with the hook-shaped fingers 47 are adjustably held. Adjustable stops 48 are arranged on the guide collars 43 which cooperate with movable stops 49 on the finger arms 46.

These finger arms 46 are shown separately and to a bigger scale in Figs. 13 and 14, Fig. 13 being a side elevation and Fig. 14 a plan view of such an arm in longitudinal section. Arm 46 is cartridge shaped and held at one end by clip 45 supported on pin 44, this clip being adjustable both on arm 46 and on pin 44. At the other end of arm 46 is the bearing housing 50 for the movable axis of finger 47 which is provided with gear wheel 51. This latter is driven by the rack rod 52 which is located on the tubular slide 53 and projects through an opening 54 in housing 50. At the other end of slide 53 is the stop 49 and the slide can move inside the hollow arm 46 against the pull of a spring 55, bolt 56 which is fastened to arm 46 sliding in a slot 57 provided in slide 53. On the other hand the slit-shaped end of opening 54 serves to limit the movement of bolt 58 on slide 53 to the right.

When therefore stop 49 comes into contact with fixed stop 48 when push rod 42 is moved (Figs. 10 and 11), it displaces the slide 53 inside arm 46 and rack rod 52 rotates finger 47 through an angle of about 90°. The mutual adjustment of stops 48 and 49 determines the moment when the rotation occurs, this always being after the completion of the movement of the winding head 6 for guiding the wire which forms the coil end, so that the wire slides off finger 47 again.

In addition to fingers 47 which are moved by push rod 42 and work together with winding head 6, the four guide horns 35a and 35b are of importance for the formation of the coil ends, these horns being fixed inside the slots which are to be wound at both ends of the stator iron in such a manner that there is a longer horn 35a next to the slot from which the wire emerges and a shorter horn 35b next to the slot where the wire enters. The wire 34 is wound in the direction indicated by the arrow and for the purpose of forming the coil ends is drawn into the rearward recesses 59 of the guide elements 35.

Figures 17, 18:
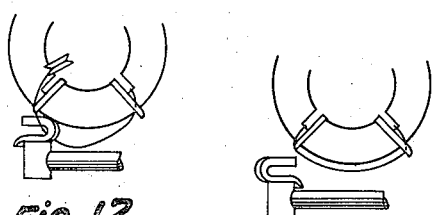

The formation of the coil end is explained by means of Figs. 10-12 and 15-18. From the winding head 6 the wire 34 is expediently drawn a distance $p$ beyond the end surface of the stator in the direction of the slot, this distance being somewhat greater than the end surface distance $q$ of the slots to be wound or the length of the coil end. By this means excessive stresses and unnecessary bending of the wire when forming the coil end are avoided. When the winding head 6 is practically in the end position (Fig. 11) wire 34 is seized by finger 47 (see Fig. 15) and due to the turning movement of the advancing winding head 6 and the simultaneous return of the push rod 46 is laid beneath the tip of the longer guide horn 35a (see Figs. 15, 16, 17) loosely under the tip of the shorter guide horn 35b. In the meantime winding head 6 which moves in advance of finger 47 has performed its turning movement and at the same time its return movement, and has arrived at the other slot which is to be wound. Whilst the winding head places the wire in this second slot or shortly afterwards, the turning movement of finger 47 occurs, which as shown in Fig. 18 allows the wire to slip out. The winding head now tightens from the other side of the stator the newly wound coil winding, particularly the wire loop of the coil end which has been released by finger 47. The coil end forms itself in the shape of the recesses 59 on the outside of horns 35. This operation repeats itself on the last mentioned end surface of the stator and then changes over to the first end surface and so on until the prescribed number of wires per coil is reached. Only one of the fingers 47 on both ends of the stator is always in action, whilst the other which is coupled with the push rod 42 returns empty. When the coil in question is wound the machine is stopped and the housing 3 turned until two new slots are brought into the winding position. This rotation can be performed manually or automatically.

From the foregoing explanation it will be obvious that fingers 47 do exert a pull or thrust on the sensitive wire 34 which is seized quite freely by these fingers and released again just as freely. The coil is fashioned to its final form solely by the winding head 6 which pulls the wire only in the direction of the slots which are to be wound and never in a transverse direction. By this means the wire and its insulation are kept in good condition.

In the constructional example shown in Fig. 3 the wire is taken over a guide roller 32 from a supply spool 31 whose axis lies parallel to the axis of the stator which is to be wound, the tension in the wire being produced either by the weight of the guide roller or by means of a brake arranged to act on the pull of the wire so that the wire receives the tension required for the winding operation.

The wire can also be supplied over a guide roller from a spool whose axis is perpendicular to the axis of the stator, this spool being provided with an adjustable friction brake. Since the rod of the winding head is moved backwards and forwards continuously its distance from the stationary guide roller also changes continuously whilst the machine is in operation. According to the invention the distance between the rotating axis of this guide roller over which the wire passes to the supporting rod of the winding head and the longitudinal axis of the supporting rod is at least equal to twice the maximum possible longitudinal movement of this rod.

If for instance the maximum longitudinal movement is 250 mm. then the guide roller over which the wire feed passes must be not less than 500 mm. away from the rod indicated by the numeral 10 in Figs. 1 and 2. If the wire runs perpendicularly onto the axis of the rod 10 when the wire guide roller 33 is in the middle of its movement, then when the movement reaches its maximum value the wire has an inclination to the perpendicular not exceeding 28°, i. e. twice the angle whose cotangent is equal to 4.

A constructional example of this arrangement is illustrated in Figs. 19-21. The same reference numerals are used here as for Figs. 1-3, only those elements being shown, however, which are absolutely essential. In the upper part of the machine housing 1 is the rotatable ring 3 in which the stator 2 which is to be wound is fixed. Rod 10 which is supported in the bearing 11 mounted on arm 12 projects through the stator and carries the winding head 6 at its other end. Winding head 6 is moved backwards and forwards through the stator 2 by means of the swinging arm 16 actuated by the machine and at the same time lifted to the extent indicated by the arc path of pivot 15. Wire 34 is supplied by winding head 6 over guide roller 33 and adjustable brake 38 from the feed spool 31 which is arranged vertically on a pin 37 mounted on baseplate 39. Baseplate 39 is so long that the distance $b$ between the axis of brake 38 and the axis of rod 10 is at least equal to twice the maximum deflection $a$ of lever 16, this deflection being equal to the longitudinal movement of rod 10.

From Fig. 21, which shows only rod 10 and brake 38 in plan view, it can be seen that when $b=2a$ the maximum angle of deflection of the wire is 28°. This has the effect of avoiding variations in the tension of the wire and damages to the wire insulation caused by the brake roller 38.

The winding machine according to the invention can be used for the simultaneous winding of more than one wire and in this case the rollers for the wires must be provided with a corresponding number of grooves. The transmission rodding for producing the forward and backward motion as well as the up and down and turning motion of the winding head, together with the angular movement of both fingers, can also be achieved by other means without affecting the fundamental principle of the invention.

I claim:

1. In a machine for winding the slotted stator of an electrical device, a relatively stationary ring frame for supporting a slotted stator, wire laying mechanism having wire guiding means at one end thereof, means for imparting reciprocating movement to said wire laying mechanism to carry said wire guiding means back and forth through the bore of the stator supported by the ring frame, means for moving the wire guiding means angularly in opposite directions at opposite sides of the stator, a guide finger at each side of the ring frame, means pivotally supporting each guide finger for oscillatory movement over an arcuate path, and means for oscillating each finger to pick up the wire during angular movement of the wire guiding means adjacent that finger and to move away from the wire after the wire guiding means has moved into the stator and drawn the wire into the slot of the stator.

2. In a machine for winding a slotted electrical stator, the combination with a relatively stationary ring frame for supporting a stator, a wire laying device and means for reciprocating the same back and forth through the bore of the stator, and wire guiding means at an end of the wire laying device, of means for placing the wire in circumferentially spaced slots of the stator: said wire-placing means comprising means for moving the wire guiding means angularly in opposite directions at the respective sides of the stator, and an angularly oscillating guide finger at each side of the ring frame for picking up the wire during a part of the angular movement of the wire guiding means adjacent that finger.

3. In a machine for winding a slotted electrical stator, the invention as recited in claim 2, wherein said fingers oscillate about an axis angularly displaced from the axis of the stator.

4. In a machine for winding a slotted electrical stator, the invention as recited in claim 2, wherein said means for moving the wire guiding means angularly carries the said wire guiding means angularly beyond the slots in which the winding is to be formed, and each oscillatory finger picks up the wire during the angular movement of the wire guiding means adjacent that finger and moves away from the wire upon the following movement of the wire guiding means into the stator to draw the wire into the slot.

5. In a machine for winding a slotted electrical stator, the invention as recited in claim 2, in combination with means for imparting to said wire laying device a movement radially of the stator axis to carry the wire guiding means radially beyond the bases of the stator slots at the respective ends of the reciprocatory movement of the wire laying device.

6. In a machine for winding a slotted electrical stator, the invention as recited in claim 2, wherein said means for reciprocating said wire laying device back and forth through said stator includes means for moving said wire guiding means along an arcuate path whose apex lies approximately at the midpoint of the stator length and whose ends are radially positioned beyond the bases of the stator slots.

7. In a machine for winding a slotted electrical stator, a relatively stationary ring frame for supporting a stator, a wire laying device comprising a rod having eccentrically positioned wire guiding means at one end thereof, means for moving said rod axially to carry the wire guiding means back and forth through the bore of the stator, and means for imparting angular movement to said rod at the ends of the reciprocatory movement.

8. In a machine for winding a slotted electrical stator, the invention as recited in claim 7, wherein the end of said rod opposite the wire guiding means is slidably supported by a bearing, and the means for axially moving said rod comprises a lever pivotally connected to said rod between the ends thereof.

9. In a machine for winding a slotted electrical stator, the invention as recited in claim 7, wherein the end of said rod opposite the wire guiding means is slidably supported by a bearing, and the means for axially moving said rod comprises a lever pivotally connected to said rod between the ends thereof, and in combination with a lever pivotally connecting an intermediate point of the rod to a relatively fixed point, whereby the wire guiding means follows an arcuate path.

10. In a machine for winding a slotted electrical stator, the invention as recited in claim 7, wherein said means for imparting angular movement to said rod comprises a gear on said rod, and a reciprocating rack bar.

11. In a machine for winding a slotted electrical stator, the combination with a relatively stationary ring frame for supporting a stator, a wire laying device including a wire guide, and means for moving the wire guide back and forth through the bore of the stator along an arcuate path, the ends of the arcuate path being axially substantially beyond the respective end surfaces of the stator and radially beyond the bottoms of the stator slots, of means for swinging the wire guide angularly to form the coil ends, a guide finger at each side of the stator, means supporting each guide finger for oscillatory movement, and means for moving each guide finger in one direction to pick up the wire during swinging movement of the wire guide adjacent that finger and for reversing the direction of movement of the fingers to release the wire upon the arrival of the wire guide at the opposite side of the stator.

12. In a machine for winding a slotted electrical stator, the invention as recited in claim 11, wherein said finger-moving means includes cooperating members adjustable to vary the oscillatory displacement of the fingers.

13. In a machine for winding a slotted electrical stator, the invention as recited in claim 11, wherein said finger-supporting means comprise rotatable supports, and means adjustable to regulate the effective length of the fingers.

14. In a machine for winding a slotted electrical stator, the invention as recited in claim 11, wherein said fingers are of conical shape.

15. In a machine for winding a slotted electrical stator, the invention as recited in claim 11, wherein said fingers are of hook shape.

16. In a machine for winding a slotted electrical stator, the invention as recited in claim 11, in combination with guide horns removably seated in slots between the slots in which the wire is being wound, said guide horns projecting beyond the end faces of the stator for shaping the ends of the winding.

17. In a machine for winding a slotted electrical stator, the invention as recited in claim 11, wherein said means for moving the fingers is connected to and actuated by the means for swinging the wire guide angularly.

18. In a machine for winding a slotted electrical stator, the invention as recited in claim 11, wherein the means for swinging the wire guide angularly includes means adjustable to regulate the angular movement of the wire guide.

19. In a machine for winding a slotted electrical stator, the invention as recited in claim 11, in combination with means for angularly adjusting said relatively stationary ring frame.

20. In a machine for winding a slotted electrical stator, the invention as recited in claim 11, wherein said finger-supporting means includes a reciprocating member, means supporting said member for movement at an angle to the axis of the stator, and means mounting said fingers at the ends of the reciprocating member.

21. In a machine for winding a slotted electrical stator, the invention as recited in claim 11, wherein said finger-supporting means includes a reciprocating member, means supporting said member for movement at an angle to the axis of the stator, and an arm at each end of said member for supporting a guide finger.

22. In a machine for winding a slotted electrical stator, the invention as recited in claim 11, wherein said finger-supporting means includes a reciprocating member, means supporting said member for movement at an angle to the axis of the stator, and an arm at each end of said member for supporting a guide finger, each arm being adjustable as to length and height.

23. In a machine for winding a slotted electrical stator, the invention as recited in claim 11, wherein said finger-supporting means includes a reciprocating member, means supporting said member for movement at an angle to the axis of the stator, and an arm mounted at each end of said member, and means supporting a guide finger on each arm, said arms being substantially parallel to each other and inclined to the path of movement of the reciprocating member.

24. In a machine for winding a slotted electrical stator, the invention as recited in claim 11, wherein said finger-supporting means includes a reciprocating member, means supporting said member for movement at an angle to the axis of the stator, and means supporting the guide fingers from opposite ends of the reciprocating member for angular movement about axes inclined to the path of movement of said member.

25. In a machine for winding a slotted electrical stator, the invention as recited in claim 11, wherein said finger-supporting means includes a reciprocating member, means supporting said member for movement at an angle to the axis of the stator, and means supporting the guide fingers from opposite ends of the reciprocating member for angular movement about axes at right angles to the path of movement of said member.

26. In a machine for winding a slotted electrical stator, the invention as recited in claim 11, wherein said finger-supporting means includes a reciprocating member, means supporting said member for movement at an angle to the axis of the stator, an arm at each end of said member for supporting a guide finger; and means within the arms for imparting oscillatory movement to the respective guide fingers.

27. A machine for winding a slotted electrical stator and of the type including a wire laying device for moving a winding head back and forth through the bore of a stationary stator and for swinging the winding head angularly, guide fingers at opposite ends of the stator, and means supporting said guide fingers for oscillatory movement to cooperate with said winding head to locate the wire in a pair of circumferentially spaced slots, characterized by the fact that said supporting means comprises a reciprocating rod and means for moving the same along a path inclined to the axis of the stator, arms mounted on the opposite ends of said rod and extending towards said stator, a staff and bearing supporting each finger for pivotal movement on its associated arm, a gear on each staff, and means including a toothed rack rod slidable in each arm for rotating the associated gear and finger.

28. A machine for winding a slotted electrical stator and of the type including a wire laying device for moving a winding head back and forth through the bore of a stationary stator and for swinging the winding head angularly, guide fingers at opposite ends of the stator, and means supporting said guide fingers for oscillatory movement to cooperate with said winding head to locate the wire in a pair of circumferentially spaced slots, characterized by the fact that said supporting means comprises a reciprocating rod and means for moving the same along a path inclined to the axis of the stator, arms mounted on the opposite ends of said rod and extending towards said stator, a staff and bearing supporting each finger for pivotal movement on its associated arm, a gear on each staff, means including a toothed rack rod slidable in each arm for rotating the associated gear and finger, and a stop on each arm and cooperating with a relatively fixed stop member for imparting sliding movements to the rack rods.

29. A machine as recited in claim 28, wherein said stops comprise members adjustably mounted on said arms at the ends opposite the said fingers.

30. A machine for winding a slotted electrical stator comprising means for supporting a stator, wire laying means including a winding head, means for moving the same back and forth through the bore of the stator and beyond the end faces of the stator for a distance at least equal to the length of the stator slot, means for swinging the winding head circumferentially to carry the wire towards a circumferentially spaced slot, and oscillating means at each face of the stator movable to pick up the wire prior to the swinging of the winding head and to carry the wire into line with said circumferentially spaced slot, said oscillating means releasing the wire upon the arrival of the winding head at the opposite end face of the stator, whereby the wire is drawn from said oscillating means and into the slot by the winding head.

31. A machine as recited in claim 30, wherein said oscillating means includes guide fingers, and means for moving said fingers angularly during the return movement of said winding head through the stator.

32. A machine as recited in claim 30, wherein said wire laying means includes a reciprocating rod carrying said winding head, in combination with means including a fixed guide roller for supplying wire to said winding head, and means supporting said guide roller at a distance from the axis of said rod at least equal to twice the longitudinal movement of the rod.

33. A machine as recited in claim 30, wherein said wire laying means includes a reciprocating rod carrying said winding head, in combination with means including a fixed guide roller for supplying wire to said winding head, means including said roller forming a tensioning brake for the wire, and means supporting said guide roller at a distance from the axis of said rod at least equal to twice the longitudinal movement of the rod.

OTTO WIRTH.